(12) United States Patent
Machida

(10) Patent No.: US 11,623,350 B2
(45) Date of Patent: Apr. 11, 2023

(54) GRIPPING DEVICE

(71) Applicant: AISIN CORPORATION, Aichi (JP)

(72) Inventor: Takashi Machida, Kariya (JP)

(73) Assignee: AISIN CORPORATION, Kariya (JP)

(*) Notice: Subject to any disclaimer, the term of this patent is extended or adjusted under 35 U.S.C. 154(b) by 368 days.

(21) Appl. No.: 16/853,835

(22) Filed: Apr. 21, 2020

(65) Prior Publication Data

US 2020/0338749 A1 Oct. 29, 2020

(30) Foreign Application Priority Data

Apr. 24, 2019 (JP) .............................. JP2019-083018

(51) Int. Cl.
| | |
|---|---|
| *B25J 13/08* | (2006.01) |
| *B25J 15/00* | (2006.01) |
| *B25J 9/02* | (2006.01) |
| *B25J 15/12* | (2006.01) |
| *B25J 15/10* | (2006.01) |

(52) U.S. Cl.
CPC ........... *B25J 15/0023* (2013.01); *B25J 9/023* (2013.01); *B25J 13/088* (2013.01); *B25J 15/12* (2013.01); *B25J 15/10* (2013.01)

(58) Field of Classification Search
CPC ...... B25J 9/023; B25J 13/088; B25J 15/0023; B25J 15/10; B25J 15/12
See application file for complete search history.

(56) References Cited

U.S. PATENT DOCUMENTS

| | | | | |
|---|---|---|---|---|
| 5,106,138 | A | * | 4/1992 | Lawson ................... B25J 15/10 294/2 |
| 5,799,543 | A | * | 9/1998 | Nagai .................. B25J 19/0029 74/490.09 |
| 2016/0279803 | A1 | * | 9/2016 | Lessing ................... B32B 38/10 |
| 2018/0281201 | A1 | * | 10/2018 | Rosenstein ............. F15B 15/10 |
| 2019/0145455 | A1 | * | 5/2019 | Curhan ................... F16B 35/06 411/371.1 |
| 2019/0299424 | A1 | * | 10/2019 | Curhan ................ B25J 19/0075 |
| 2020/0346792 | A1 | * | 11/2020 | Curhan ................ B25J 15/0023 |

FOREIGN PATENT DOCUMENTS

| | | |
|---|---|---|
| JP | 06-155220 A | 6/1994 |
| JP | 2018-086718 A | 6/2018 |
| JP | 2019-018304 A | 2/2019 |
| JP | 2019-018305 A | 2/2019 |

* cited by examiner

*Primary Examiner* — Saul Rodriguez
*Assistant Examiner* — Brendan P Tighe
(74) *Attorney, Agent, or Firm* — Oblon, McClelland, Maier & Neustadt, L.L.P.

(57) ABSTRACT

A gripping device includes: a gripping portion configured to be displaced between a closed position in which a workpiece is grasped and an open position in which the workpiece is released; a holding portion configured to hold the gripping portion; a shaft portion that extends from the holding portion; a support portion configured to support the shaft portion such that the gripping portion faces the workpiece; a driving unit configured to displace the gripping portion between the closed position and the open position; and a moving mechanism configured to move the support portion in an axial direction of the shaft portion, in which the support portion is configured to support the shaft portion such that when a load acts on the shaft portion in the axial direction, the shaft portion is slidable relative to the support portion.

5 Claims, 5 Drawing Sheets

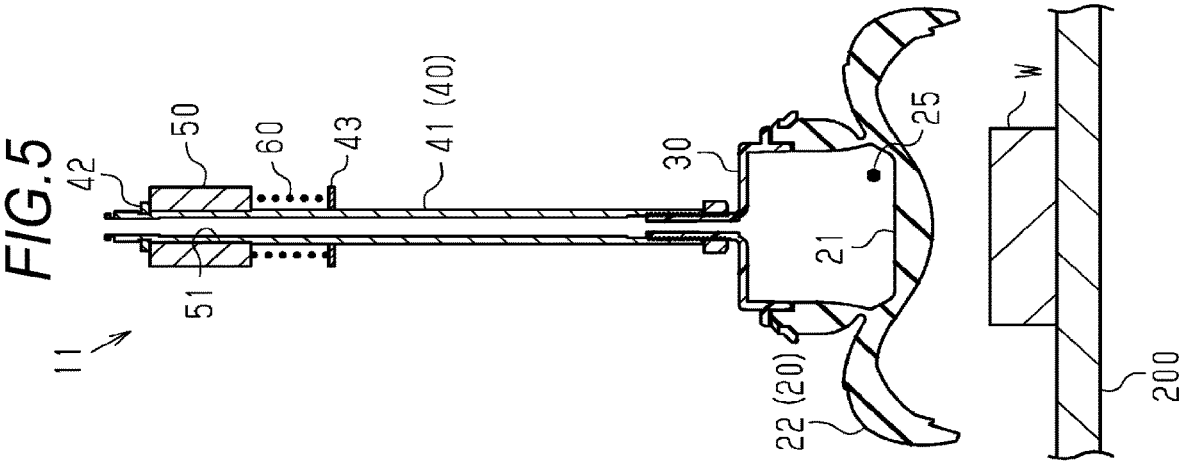
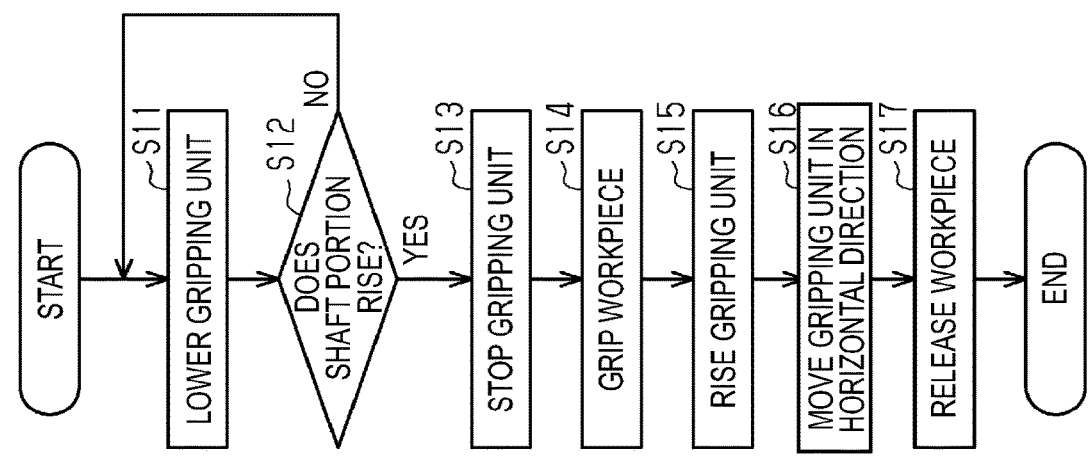

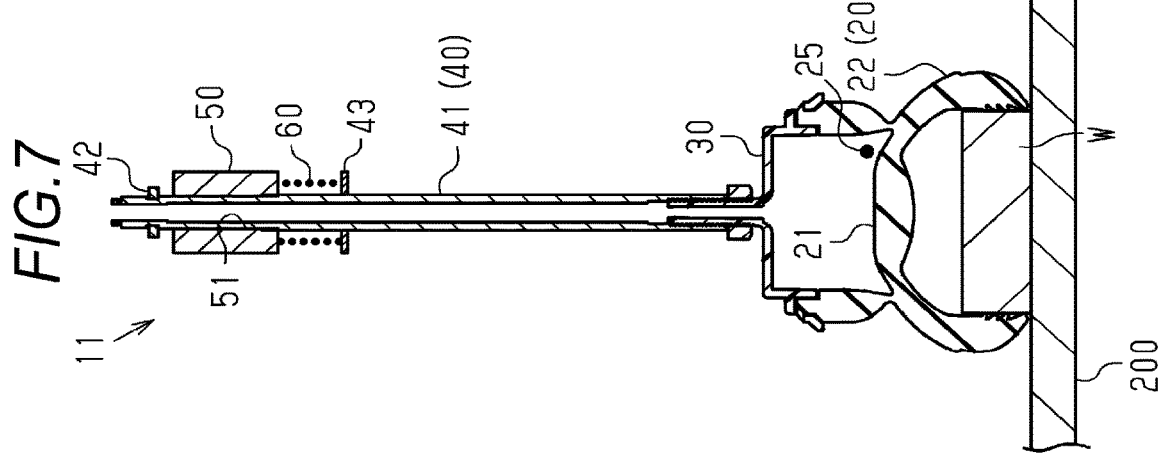
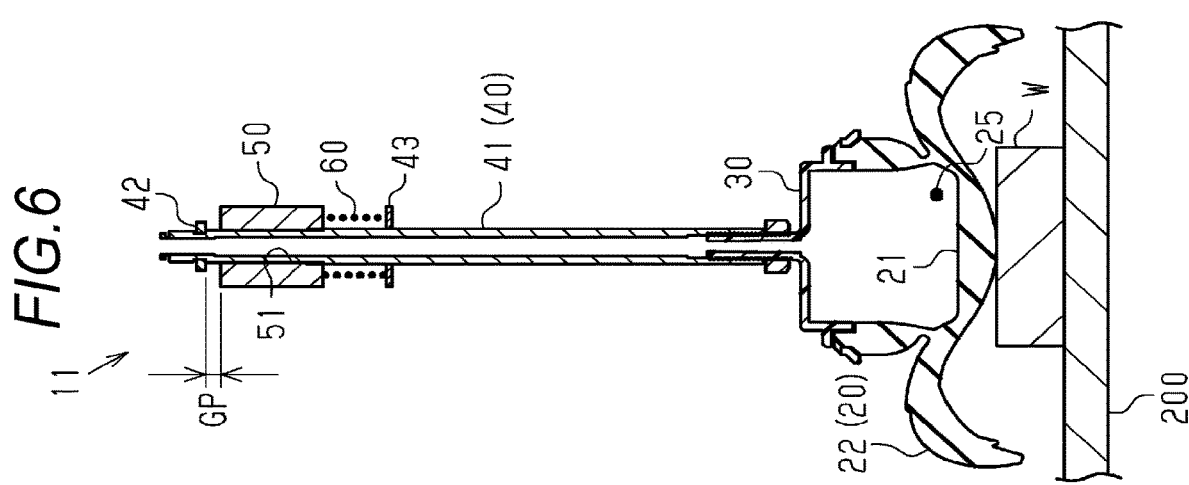

GRIPPING DEVICE

CROSS REFERENCE TO RELATED APPLICATIONS

This application is based on and claims priority under 35 U.S.C. § 119 to Japanese Patent Application 2019-083018, filed on Apr. 24, 2019, the entire contents of which are incorporated herein by reference.

TECHNICAL FIELD

This disclosure relates to a gripping device.

BACKGROUND DISCUSSION

JP 2018-86718A (Reference 1) discloses a gripping device including a bag shaped gripping body having a plurality of finger portions, a case in which the gripping body is fixed, and an air cylinder connected to the case. The gripping body grips a workpiece when an internal pressure is depressurized to below an atmospheric pressure. On the other hand, when an inside of the gripping body communicates with the atmosphere, the grip body releases the workpiece. The gripping device moves the gripping body close to a base on which the workpiece is disposed by extending the air cylinder, or moves the gripping body away from the base by contracting the air cylinder.

When the above-described gripping device continues to extend the air cylinder even after the gripping body comes into contact with the workpiece, a gripping portion presses the workpiece hard, and thus a large load may act on the gripping portion. Thus, a need exists for a gripping device which is not susceptible to the drawback mentioned above.

SUMMARY

Hereinafter, a configurations of an aspect of this disclosure will be described.

A gripping device according to an aspect of this disclosure includes a gripping portion configured to be displaced between a closed position in which a workpiece is grasped and an open position in which the workpiece is released, a holding portion configured to hold the gripping portion, a shaft portion that extends from the holding portion, a support portion configured to support the shaft portion such that the gripping portion faces the workpiece, a driving unit configured to displace the gripping portion between the closed position and the open position, and a moving mechanism configured to move the support portion in an axial direction of the shaft portion, and the support portion is configured to support the shaft portion such that when a load acts on the shaft portion in the axial direction, the shaft portion is slidable relative to the support portion.

BRIEF DESCRIPTION OF THE DRAWINGS

The foregoing and additional features and characteristics of this disclosure will become more apparent from the following detailed description considered with the reference to the accompanying drawings, wherein:

FIG. 4 is a flowchart showing a flow of processing executed by a control unit of the gripping device;

FIG. 5 is a broken front view illustrating an operation of the gripping device;

FIG. 6 is a broken front view illustrating the operation of the gripping device; and FIG. 7 is a broken front view illustrating the operation of the gripping device.

DETAILED DESCRIPTION

Hereinafter, an embodiment of a gripping device will be described with reference to drawings. The gripping device of the present embodiment is a device for conveying a workpiece placed on a placing platform in a horizontal direction.

Figure 1:
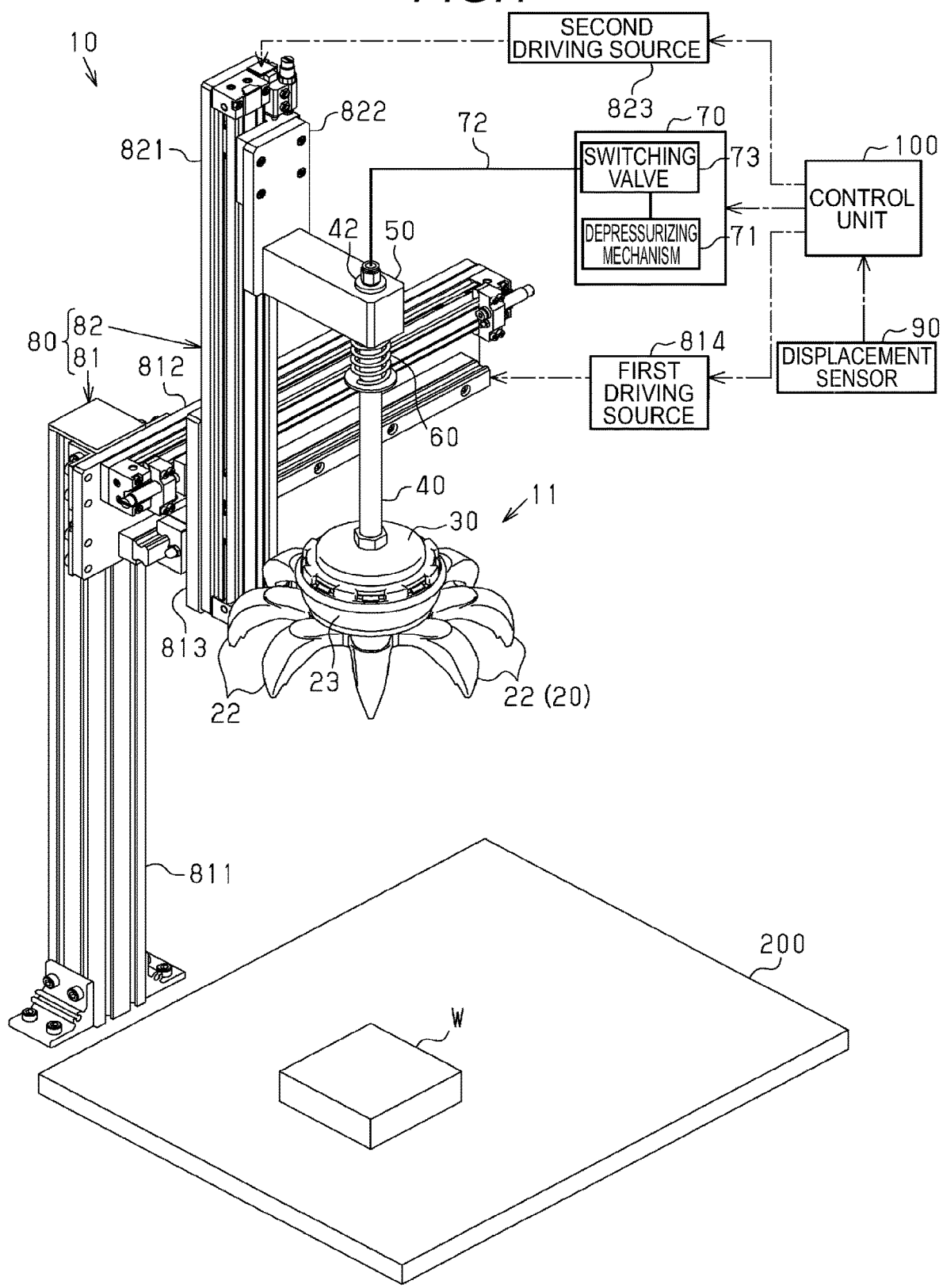
FIG. 1 is a perspective view showing a schematic configuration of a gripping device according to an embodiment.

As shown in FIG. 1, a gripping device 10 includes a gripping portion 20 that grips a workpiece W, a holding portion 30 that holds the gripping portion 20, a shaft portion 40 that extends from the holding portion 30, a support portion 50 that supports the shaft portion 40, a biasing member 60 that biases the shaft portion 40, a driving unit 70 that drives the gripping portion 20, and a moving mechanism 80 that moves the support portion 50. Further, the gripping device 10 includes a displacement sensor 90 that detects an axial-direction displacement of the shaft portion 40 and a control unit 100 that controls operations of components of the gripping device 10. In a following description, in the gripping device 10, the gripping portion 20, the holding portion 30, the shaft portion 40, the support portion 50, and the biasing member 60 are also collectively referred to as a "gripping unit 11".

Figure 2:
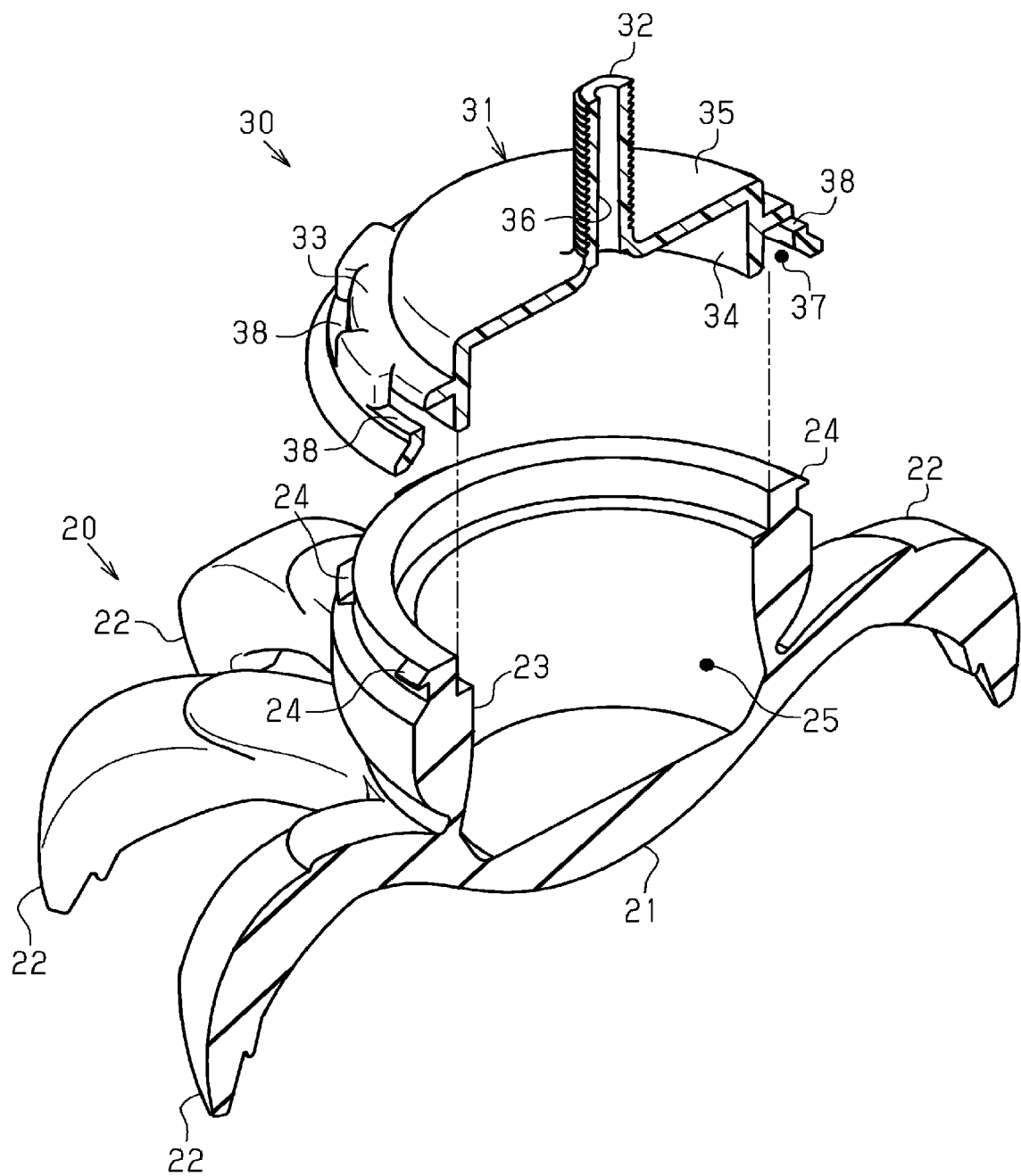
FIG. 2 is an exploded perspective view showing a gripping portion and a holding portion of the gripping device in a cutaway manner.

As shown in FIG. 2, the gripping portion 20 includes an elastic wall 21 that reciprocates under an action of an external force, a plurality of arms 22 that extend from the elastic wall 21, a tubular peripheral wall 23 that extends in a direction different from those of the plurality of arms 22 from a periphery of the elastic wall 21, and engagement projection portions 24 that engage with the holding portion 30. An internal space 25 surrounded by the elastic wall 21 and the peripheral wall 23 is formed in the gripping portion 20.

The elastic wall 21 has a substantially disc shape. The elastic wall 21 reciprocates in accordance with a pressure change of the internal space 25. Specifically, when a pressure of the internal space 25 is lower than a pressure of an external space defined by the inner space 25 and the elastic wall 21, the elastic wall 21 is displaced in a direction of decreasing a volume of the internal space 25. On the other hand, when the pressure of the internal space 25 is equal to the pressure of the external space, the elastic wall 21 is displaced in a direction of increasing the volume of the internal space 25. The pressure of the external space is, for example, an atmospheric pressure. The elastic wall 21 preferably has a part serving as a section having a thickness smaller than that of other parts between a central portion and a peripheral portion in order to enable smooth reciprocating motion.

The plurality of arms 22 extend outward in a radial direction of the elastic wall 21 from the periphery of the elastic wall 21. The plurality of arms 22 are disposed at equal intervals in a peripheral direction of the elastic wall 21 and extend radially from the elastic wall 21. Each of the arms 22 has a curved shape, and has a claw shape with a tapered tip at a front end. Then, as shown in FIG. 2, in a state in which the elastic wall 21 is disposed at a protruding position, the gripping portion 20 is positioned at an "open position" in which the front ends of the plurality of arms 22 are separated from one another. On the other hand, in a state in which the elastic wall 21 is disposed at a retracting position and which is different from the state shown in FIG. 2, the gripping portion 20 is positioned at a "closed position" in which the front ends of the plurality of arms 22 approaches each other. Thus, the plurality of arms 22 are opened and closed in accordance with the reciprocating motion of the elastic wall 21. The open position is a position in which the workpiece W is released from the gripping portion 20, and the closed position is a position in which the workpiece W is grasped by the gripping portion 20.

The peripheral wall 23 extends along an axial direction from the elastic wall 21. A base end of the peripheral wall 23 connected to the elastic wall 21 is preferably thinner than the other parts in thickness in order to enable smooth close and open operations of the plurality of arms 22. At a front end of the peripheral wall 23, a plurality of engagement projection portions 24 are formed at equal intervals in the peripheral direction of the peripheral wall 23. Each of the engagement projection portions 24 protrudes from the peripheral wall 23 in a direction intersecting the axial direction.

The gripping portion 20 is integrally formed with an elastomer such as rubber and resin that can be elastically deformed more than a metal material. That is, even when the gripping portion 20 has an undercut shape, the gripping portion 20 can be formed by a normal mold without using a slide core.

As shown in FIG. 2, the holding portion 30 includes a cap 31 that covers an opening of the gripping portion 20, a flow path forming portion 32 that extends from a central portion of the cap 31, and a flange portion 33 that extends from the cap 31.

The cap 31 has a cylindrical side wall 34 and a disc shaped upper wall 35. The cap 31 may have a shape that can cover the opening of the gripping portion 20. A first flow path 36 extending in the axial direction is formed in the flow path forming portion 32. The flange portion 33 extends in a direction away from the upper wall 35 of the cap 31 after extending in the radial direction of the cap 31 from the side wall 34 of the cap 31. Thus, an accommodation space 37 that accommodates the front end of the peripheral wall 23 of the gripping portion 20 is formed between the side wall 34 of the cap 31 and the flange portion 33. The accommodation space 37 is an annular space. In the flange portion 33, a plurality of engagement recess portions 38 are formed at equal intervals in the peripheral direction of the flange portion 33. The engagement recess portions 38 communicate with the accommodation space 37. The holding portion 30 is integrally molded, for example, by injection molding of a resin material.

As shown in FIG. 2, when the gripping portion 20 is mounted to the holding portion 30, the peripheral wall 23 of the gripping portion 20 is inserted into the accommodation space 37 of the holding portion 30. Then, the engagement projection portions 24 of the gripping portion 20 engage with the engagement recess portions 38 of the holding portion 30. Thus, the gripping portion 20 is mounted to the holding portion 30. In a state in which the gripping portion 20 is mounted to the holding portion 30, the internal space 25 of the gripping portion 20 is a closed space except for the first flow path 36.

Figure 3:
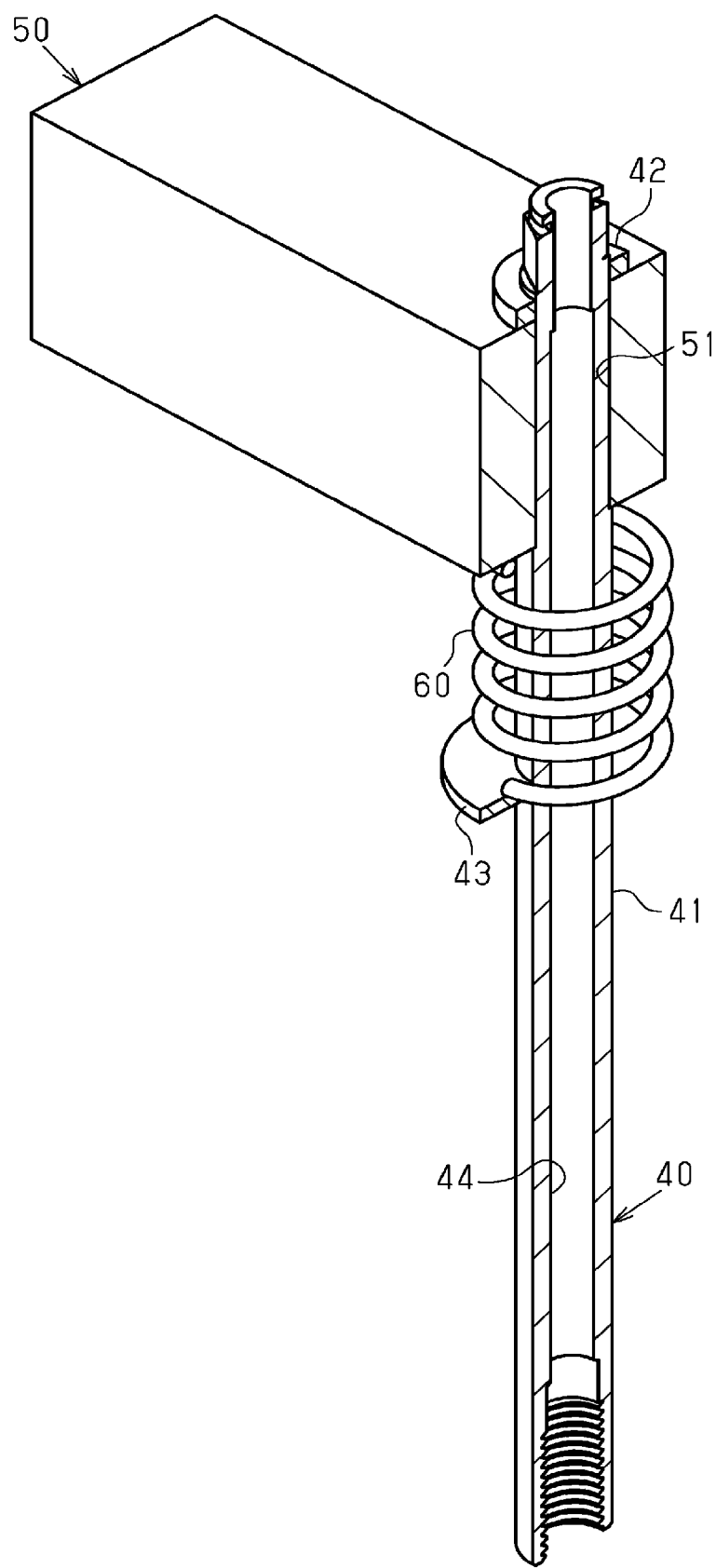
FIG. 3 is a perspective view showing a shaft portion and a support portion of the gripping device in a cutaway manner.

As shown in FIG. 3, the shaft portion 40 includes a rod shaped shaft portion body 41, a first protruding portion 42 as an example of a "protruding portion" provided at a position closer to a second end of the shaft portion body 41, and a second protruding portion 43 provided at an intermediate portion in a longitudinal direction of the shaft portion body 41.

A second flow path 44 is formed through the shaft portion body 41 in the axial direction. A first end of the shaft portion body 41 is connected to the flow path forming portion 32 of the holding portion 30, and a first end of the second flow path 44 is connected to the first flow path 36. Each of the first protruding portion 42 and the second protruding portion 43 has a flange shape. Outer diameters of the first protruding portion 42 and the second protruding portion 43 are larger than an outer diameter of the shaft portion body 41. The first protruding portion 42 is an engaging portion with the support portion 50, and the second protruding portion 43 is a base of the biasing member 60. One of the first protruding portion 42 and the second protruding portion 43 may be formed integrally with the shaft portion body 41.

The support portion 50 has a substantially rectangular parallelepiped shape. A base end of the support portion 50 is connected to the moving mechanism 80. A sliding hole 51 is formed through a front end of the support portion 50. An inner diameter of the sliding hole 51 is slightly larger than the outer diameter of the shaft portion body 41 and smaller than the outer diameters of the first protruding portion 42 and the second protruding portion 43. That is, the sliding hole 51 has an inner diameter such that the shaft portion body 41 is slidable therein.

The shaft portion body 41 of the shaft portion 40 is inserted into the sliding hole 51 of the support portion 50. The first protruding portion 42 of the shaft portion 40 is in contact with an upper surface of the support portion 50. Thus, the support portion 50 supports the shaft portion 40 by supporting the first protruding portion 42 of the shaft portion 40 from vertically below. As shown in FIG. 1, in a state in which the support portion 50 supports the shaft portion 40, the axial direction of the shaft portion 40 is oriented in a vertical direction, and thus the gripping portion 20 faces the workpiece W.

The biasing member 60 is disposed in a compressed state between a lower surface of the support portion 50 and the second protruding portion 43 of the shaft portion 40. That is, the biasing member 60 biases both the shaft portion 40 and the support portion 50 such that the first protruding portion 42 of the shaft portion 40 is pressed against the upper surface of the support portion 50. The biasing member 60 is configured with a coil spring. The biasing member 60 may be configured with an elastomer such as rubber and resin.

As shown in FIG. 1, the driving unit 70 includes a depressurizing mechanism 71, a connection flow path 72 connecting the second flow path 44 of the shaft portion body 41 to the depressurizing mechanism 71, and a switching valve 73 provided in the middle of the connection flow path 72. The depressurizing mechanism 71 may be configured with a suction pump or the like. The depressurizing mechanism 71 suctions air from the internal space 25 of the gripping portion 20 and depressurizes the internal space 25. The switching valve 73 switches between a depressurized state in which the depressurizing mechanism 71 and the connection flow path 72 are connected, and an open state in which the connection flow path 72 is connected to an external space (atmosphere). That is, when the switching valve 73 is switched to the depressurized state, the pressure of the internal space 25 becomes lower than the outside air pressure, and the elastic wall 21 is displaced in the direction of decreasing the volume of the internal space 25. On the other hand, when the switching valve 73 is switched to the open state, the pressure of the internal space 25 becomes equal to the outside air pressure, and the elastic wall 21 is displaced in the direction of increasing the volume of the internal space 25. Thus, the driving unit 70 displaces the gripping portion 20 between the closed position and the open position.

As shown in FIG. 1, the moving mechanism 80 includes a first moving mechanism 81 for moving the gripping unit 11 in the horizontal direction and a second moving mechanism 82 for moving the gripping unit 11 in the vertical direction.

The first moving mechanism 81 includes a post 811 that extends in the vertical direction, a first rail 812 that extends in the horizontal direction, a first moving body 813 that moves along the first rail 812, and a first driving source 814 for moving the first moving body 813. The second moving mechanism 82 includes a second rail 821 that extends in the vertical direction, a second moving body 822 that moves along the second rail 821, and a second driving source 823 for moving the second moving body 822.

The first rail 812 of the first moving mechanism 81 is fixed to an upper end of the post 811. The second rail 821 of the second moving mechanism 82 is fixed to the first moving body 813 of the first moving mechanism 81, and the base end of the support portion 50 is fixed to the second moving body 822 of the second moving mechanism 82. The first driving source 814 and the second driving source 823 may be a fluid pressure cylinder utilizing an air pressure and a hydraulic pressure, or may be an electric actuator having a motor. Thus, the first moving mechanism 81 moves the gripping unit 11 in the horizontal direction by moving the second moving mechanism 82 in the horizontal direction. The second moving mechanism 82 moves the gripping unit 11 in the vertical direction.

In the following description, in the axial direction of the shaft portion 40, a direction in which the gripping unit 11 is moved close to the workpiece W is also referred to as a "first direction", and a direction in which the gripping unit 11 is moved away from the workpiece W is also referred to as a "second direction". In the present embodiment, the first direction is vertically downward and the second direction is vertically upward.

The displacement sensor 90 is disposed on the upper surface of the support portion 50. The displacement sensor 90 detects a displacement of the shaft portion 40 in the axial direction. Specifically, the displacement sensor 90 detects a vertical upward displacement amount of the first protruding portion 42 of the shaft portion 40 relative to the support portion 50. The displacement sensor 90 may be a switch that changes an on-off state of a signal to be output in a case in which the first protruding portion 42 is in contact with the support portion 50 and a case in which the first protrusion portion 42 is separated from the support portion 50. The displacement sensor 90 may be a transmissive or reflective photoelectric sensor or may be a sensor of another type. The displacement sensor 90 outputs a detection signal corresponding to the displacement amount of the shaft portion 40 to the control unit 100.

The control unit 100 moves the gripping unit 11 in the horizontal direction and the vertical direction by controlling operations of the first driving source 814 and the second driving source 823. The control unit 100 controls an operation of the driving unit 70 to displace the gripping portion 20 between the closed position and the open position. Specifically, when the gripping unit 11 is lowered, the control unit 100 displaces the gripping portion 20 from the open position to the closed position at the timing when the gripping portion 20 comes into contact with the workpiece W. In the present embodiment, when the gripping portion 20 comes into contact with the workpiece W while the gripping unit 11 is being lowered, a part of the gripping unit 11 other than the supporting unit 50 rises relative to the support portion 50. In other words, the support portion 50 continues to be lowered, and the part of the gripping unit 11 other than the support portion 50 is not lowered. Therefore, when the displacement sensor 90 detects that the shaft portion 40 rises relative to the support portion 50, the control unit 100 determines that the gripping portion 20 comes into contact with the workpiece W.

Next, a flow of processing performed by the control unit 100 to convey the workpiece W will be described with reference to a flowchart shown in FIG. 4. The processing is performed in a situation in which the workpiece W is positioned vertically above the placing platform 200 on which the workpiece W is placed.

As shown in FIG. 4, the control unit 100 lowers the gripping unit 11 toward the workpiece W (step S11). Subsequently, based on a detection result of the displacement sensor 90, the control unit 100 determines whether the shaft portion 40 rises relative to the support portion 50 during the lowering of the gripping unit 11 (step S12).

When the shaft portion 40 does not rise relative to the support portion 50 (step S12: NO), the control unit 100 proceeds to step S11. In this case, the lowering of the gripping unit 11 is continued. On the other hand, when the shaft portion 40 rises relative to the support portion 50 (step S12: YES), in other words, when the gripping portion 20 starts to press the workpiece W, the control unit 100 stops the lowering of the gripping unit 11 (step S13). Subsequently, the control unit 100 depressurizes the inner space 25 of the gripping portion 20, and causes the gripping portion 20 to grip the workpiece W (step S14).

When the gripping portion 20 is displaced to the closed position, the control unit 100 causes the gripping unit 11 to rise while keeping the internal space 25 of the gripping portion 20 depressurized (step S15). Thereafter, the control unit 100 moves the gripping unit 11 in the horizontal direction (step S16). Then, the control unit 100 sets a pressure of the internal space 25 of the gripping portion 20 to a pressure corresponding to the outside air, and causes the gripping portion 20 to release the workpiece W (step S17). Thereafter, the control unit 100 temporarily ends the present processing.

Operations of the embodiment will be described.

Operations of the gripping device 10 until the gripping portion 20 grips the workpiece W positioned vertically downward will be described in detail with reference to FIGS. 5 to 7.

As shown in FIG. 5, in a situation in which the gripping portion 20 is lowered toward the workpiece W, the gripping unit 11 is lowered as a whole. That is, the support portion 50 of the gripping unit 11 and the gripping portion 20, the holding portion 30, the shaft portion 40, and the biasing member 60 of the gripping unit 11 are lowered toward the workpiece W at the same lowering speed. Thereafter, when the gripping unit 11 continues to be lowered, the gripping portion 20 eventually comes into contact with the workpiece W.

As shown in FIG. 6, the gripping portion 20 starts to press the workpiece W when the gripping unit 11 continues to be lowered even after the gripping portion 20 comes into contact with the workpiece W. In other words, the workpiece W starts to push back the gripping portion 20. Here, when a force by which the workpiece W pushes back the gripping unit 11 exceeds a force that is a sum of a weight of the gripping unit 11 other than the support portion 50, a frictional force between the shaft portion 40 and the support portion 50, and an elastic force of the biasing member 60 and the like, the gripping portion 20, the holding portion 30, and the shaft portion 40 are not lowered while the support portion 50 continues to be lowered. In other words, the part of the gripping unit 11 other than the support portion 50 rises relative to the support portion 50. Then, when the first protruding portion 42 of the shaft portion 40 is separated from the upper surface of the support portion 50, a gap GP is generated between the support portion 50 and the first protruding portion 42 of the shaft portion 40. In the present embodiment, with an occurrence of the gap GP as a trigger, the lowering of the gripping unit 11 is stopped, and the gripping portion 20 is displaced from the open position to the closed position.

Then, as shown in FIG. 7, when the gripping portion 20 is displaced from the open position to the closed position, the gripping portion 20 grips the workpiece W. When gripping the workpiece W, the plurality of arms 22 of the gripping portion 20 elastically deform in accordance with a shape of the workpiece W. Therefore, the gripping portion 20 grips the workpiece W with high accuracy regardless of a posture of the workpiece W.

Effects of the present embodiment will be described.

(1) In the gripping device 10, when the gripping unit 11 is lowered even after the gripping portion 20 comes into contact with the workpiece W, the shaft portion 40 slides relative to the support portion 50, and thus the part of the gripping unit 11 other than the support portion 50 rises relative to the support portion 50. Therefore, even when the gripping unit 11 is lowered after the gripping portion 20 comes into contact with the workpiece W, the gripping device 10 can prevent the gripping portion 20 from continuing pressing the workpiece W. As a result, the gripping device 10 can prevent a large load from acting on the gripping portion 20 or a large load from acting on the workpiece W.

(2) The gripping device 10 displaces the gripping portion 20 from the open position to the closed position when the part of the gripping unit 11 other than the support portion 50 is displaced relative to the support portion 50 based on the detection result of the displacement sensor 90. Therefore, the gripping device 10 can set a timing at which the gripping portion 20 is displaced from the open position to the closed position to an appropriate timing. In other words, the gripping device 10 can grip the workpiece W and reduce a risk that the gripping portion 20 impairs the workpiece W.

(3) The gripping device 10 can displace the gripping portion 20 from the open position to the closed position based on the detection result of the displacement sensor 90 that detects whether the first protruding portion 42 of the shaft portion 40 is separated from the upper surface of the support portion 50. In other words, the gripping device 10 functions properly even the displacement sensor 90 is set as a sensor having a simple configuration that can detect whether the first protruding portion 42 is in contact with or separated from the upper surface of the support portion 50.

(4) Due to a counter force of the biasing member 60, the gripping device 10 can prevent the part of the gripping unit 11 other than the support portion 50 from moving relative to the support portion 50 when the gripping unit 11 is lowered. For example, the gripping device 10 can prevent displacement of the gripping portion 20 from the open position to the closed position caused by that the part of the gripping unit 11 other than the support portion 50 rises relative to the support portion 50 due to vibration or the like during the lowering of the gripping unit 11.

The present embodiment can be modified and implemented as follows. The present embodiment and the following modifications can be implemented in combination with each other within a technically consistent range.

The gripping device 10 may not include the biasing member 60. In this case, it is preferable that the outer diameter of the shaft portion body 41 of the shaft portion 40 and the inner diameter of the sliding hole 51 of the support portion 50 are managed with high accuracy in order to prevent displacement of the shaft portion 40 relative to the support portion 50 before the gripping portion 20 comes into contact with the workpiece W during the lowering of the gripping unit 11.

The support portion 50 of the gripping device 10 may support the shaft portion 40 such that the axial direction of the shaft portion 40 intersects the vertical direction. For example, the support portion 50 of the gripping device 10 may support the shaft portion 40 such that the axial direction of the shaft portion 40 is the horizontal direction. In this case, when the gripping unit 11 moves close toward the workpiece W in the horizontal direction, the gripping device 10 can obtain an effect of the above-described embodiment.

The gripping device 10 may displace the gripping portion 20 from the open position to the closed position when the displacement amount of the shaft portion 40 relative to the support portion 50 is equal to or greater than a predetermined threshold. In this case, the displacement sensor 90 is set to a sensor capable of detecting the displacement amount of the shaft portion 40 relative to the support portion 50.

The shape and material of the gripping portion 20 may be changed as appropriate in accordance with the workpiece W to be gripped by the gripping portion 20.

The gripping portion 20 may be a robot hand that is operated by a plurality of actuators.

In the gripping portion 20, among the plurality of arms 22, a part of the arms may be movable arms that can be moved by the driving unit 70, while the other arms may be fixed arms that cannot be driven by the driving unit 70.

The support portion 50 may have a rail extending in the vertical direction. In this case, the shaft portion 40 may have a moving body that slides relative to the rail of the support portion 50. That is, the support portion 50 may slidably support the shaft portion 40 via the rail.

The sliding hole 51 of the support portion 50 may be provided with a sliding bearing that allows sliding of the shaft portion body 41 of the shaft portion 40. According to the configuration, it is not necessary to manage the inner diameter of the sliding hole 51 with high accuracy in relation to the outer diameter of the shaft portion body 41.

The moving mechanism 80 may be configured with a vertical articulated robot, a horizontal articulated robot, or the like.

A gripping device according to an aspect of this disclosure includes a gripping portion configured to be displaced between a closed position in which a workpiece is grasped and an open position in which the workpiece is released, a holding portion configured to hold the gripping portion, a shaft portion that extends from the holding portion, a support portion configured to support the shaft portion such that the gripping portion faces the workpiece, a driving unit configured to displace the gripping portion between the closed position and the open position, and a moving mechanism configured to move the support portion in an axial direction of the shaft portion, and the support portion is configured to support the shaft portion such that when a load acts on the shaft portion in the axial direction, the shaft portion is slidable relative to the support portion.

In the gripping device configured as described above, when the workpiece is to be gripped by the gripping portion, first, the support portion is moved in an axial direction (hereinafter, also referred to as "first direction") by the moving mechanism so as to move the gripping portion close to the workpiece. At the time, when the moving mechanism continues to move the support portion in the first direction even after the gripping portion comes into contact with the workpiece, the gripping portion presses the workpiece in the first direction. In other words, the workpiece pushes back the gripping portion in a second direction, which is an opposite direction of the first direction. Then, a load in the second direction acts on the shaft portion via the gripping portion, and the shaft portion slides relative to the support portion. Specifically, the shaft portion does not move in the first direction together with the support portion that moves in the first direction. Thus, even when the moving of the support portion continues after the gripping portion comes into contact with the workpiece, the gripping device can prevent a large load from acting on the gripping portion due to that the shaft portion can be displaced relative to the support portion.

It is preferable that the above-described gripping device includes a displacement sensor configured to detect a displacement of the shaft portion in the axial direction, and a control unit configured to control the driving unit based on a detection result of the displacement sensor, and the control unit is configured to displace the gripping portion from the open position to the closed position when the shaft portion slides relative to the support portion.

In the gripping device configured as described above, it can be said that when the shaft portion is displaced relative to the support portion, the gripping portion is in contact with the workpiece. Therefore, the gripping device displaces the gripping portion from an open position to a closed position when the shaft portion is displaced relative to the support portion based on a detection result of a displacement sensor. Thus, the gripping device can displace the gripping portion from the open position to the closed position in a state in which the gripping portion is in contact with the workpiece. In other words, the gripping device can set a timing at which the gripping portion is displaced from the open position to the closed position to an appropriate timing.

In the above-described gripping device, it is preferable that the shaft portion includes a shaft portion body that is slidable relative to the support portion, and a protruding portion that extends in a direction intersecting the axial direction from the shaft portion body, the support portion supports the protruding portion from vertically below such that the axial direction is a vertical direction, the displacement sensor is configured to detect a displacement of the protruding portion relative to the support portion, and the control unit is configured to displace the gripping portion from the open position to the closed position when the protruding portion rises relatively to the support portion while the support portion is being lowered such that the gripping portion is moved close to the workpiece.

In the gripping device configured as described above, the displacement sensor can be set to a sensor having a simple configuration. For example, in the gripping device, the displacement sensor can be set to be a switch in which an on-off state is switched by a protruding portion being separated from the support portion.

It is preferable that the above-described gripping device includes a biasing member configured to bias the shaft portion so as to press the protruding portion against the support portion.

The gripping device configured as described above can prevent the shaft portion from rising relative to the support portion during the lowering of the support portion. Therefore, the gripping device can prevent displacement of the gripping portion from the open position to the closed position caused by rising of the shaft portion relative to the support portion before the gripping portion comes into contact with the workpiece during the lowering of the support portion.

The gripping device configured as described above can prevent a large load from acting on the gripping portion when the gripping portion is moved close to the workpiece.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A gripping device comprising:
a gripping portion configured to be displaced between a closed position in which a workpiece is grasped and an open position in which the workpiece is released;
a holding portion configured to hold the gripping portion;
a shaft portion that extends from the holding portion;
a support portion configured to support the shaft portion such that the gripping portion faces the workpiece;
a driving unit configured to displace the gripping portion between the closed position and the open position; and
a moving mechanism configured to move the support portion in an axial direction of the shaft portion, wherein
the support portion is configured to support the shaft portion such that when a load acts on the shaft portion in the axial direction, the shaft portion is slidable relative to the support portion by the load.

2. The gripping device according to claim 1, further comprising:
a displacement sensor configured to detect a displacement of the shaft portion in the axial direction; and
a control unit configured to control the driving unit based on a detection result of the displacement sensor, wherein
the control unit is configured to displace the gripping portion from the open position to the closed position when the shaft portion slides relative to the support portion.

3. The gripping device according to claim 2, wherein
the shaft portion includes a shaft portion body that is slidable relative to the support portion, and a protruding portion that extends in a direction intersecting the axial direction from the shaft portion body,
the support portion supports the protruding portion from vertically below such that the axial direction is a vertical direction,
the displacement sensor is configured to detect a displacement of the protruding portion relative to the support portion, and the control unit is configured to displace the gripping portion from the open position to the closed position when the protruding portion rises relatively to the support portion while the support portion is being lowered such that the gripping portion is moved close to the workpiece.

4. The gripping device according to claim 3, further comprising:
a biasing member configured to bias the shaft portion so as to press the protruding portion against the support portion.

5. The gripping device according to claim 1, wherein
the gripping portion includes an elastic wall that reciprocates under an action of an external force, a plurality of arms extending from the elastic wall, a tubular peripheral wall which extends in a direction different from that of the plurality of arms from a periphery of the elastic wall, engagement projection portions disposed on a front end of the peripheral wall, and an internal space surrounded by the elastic wall and the peripheral wall,
the holding portion includes a cap that covers an opening of the gripping portion, a flow path forming portion that extends from a central portion of the cap, and a flange portion extending from the cap and including engagement recess portions which engage with the engagement projection portions, and
the shaft portion includes a first end portion connected to the flow path forming portion and a second end portion supported by the support portion.

\* \* \* \* \*